United States Patent
Hartmann

(10) Patent No.: US 9,149,987 B2
(45) Date of Patent: *Oct. 6, 2015

(54) DEVICE FOR PRODUCING THREE-DIMENSIONAL MODELS BY A LAYERING TECHNIQUE

(71) Applicant: Voxeljet AG, Friedberg (DE)

(72) Inventor: Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,670

(22) Filed: Nov. 19, 2014

(65) Prior Publication Data

US 2015/0069659 A1    Mar. 12, 2015

Related U.S. Application Data

(63) Continuation of application No. 13/808,943, filed as application No. PCT/DE2011/001440 on Jul. 10, 2011, now Pat. No. 8,956,140.

(30) Foreign Application Priority Data

Jul. 13, 2010   (DE) .......................... 10 2010 027 071

(51) Int. Cl.
*B29C 67/00* (2006.01)
*B05C 5/02* (2006.01)
(Continued)

(52) U.S. Cl.
CPC ................ *B29C 67/0085* (2013.01); *B05C 5/02* (2013.01); *B29C 67/0059* (2013.01); *B33Y 10/00* (2014.12); *B33Y 30/00* (2014.12)

(58) Field of Classification Search
CPC .... B29C 67/0059; B29C 67/0085; B05C 5/02
USPC ............... 425/174.4, 375; 264/113, 308, 497, 264/460, 401
See application file for complete search history.

(56) References Cited

U.S. PATENT DOCUMENTS 2,640,629 A   6/1953   McDonald et al.
2,692,142 A   10/1954  Hunter
(Continued)

FOREIGN PATENT DOCUMENTS

DE   4005340 C2   10/1990
DE   69012292 T2   1/1995
(Continued)

OTHER PUBLICATIONS

International Search Report and Written Opinion for PCT/DE2011/001440 (published as WO2012/028129), mailed on Mar. 30, 2012.
(Continued)

*Primary Examiner* — Nahida Sultana
(74) *Attorney, Agent, or Firm* — The Dobrusin Law Firm, P.C.

(57) ABSTRACT

The present invention relates to a device for producing three-dimensional models by a layering technique, at least one print head (8) being provided for selective dispensing of at least one material onto a target surface in the form of droplets. The print head (8) is in engagement with a receptacle at two points spaced a distance apart, the position and alignment of the print head (8) relative to the target surface is steplessly adjustable in all spatial directions via these two points, and the receptacle and the target surface are movable in relation to each other.

20 Claims, 4 Drawing Sheets

(51) Int. Cl.
  *B33Y 10/00*  (2015.01)
  *B33Y 30/00*  (2015.01)

(56) References Cited

U.S. PATENT DOCUMENTS

| | | | |
|---|---|---|---|
| 2,857,938 | A | 10/1958 | Wahl |
| 3,616,969 | A | 11/1971 | Koizumi |
| 3,616,972 | A | 11/1971 | Christy |
| 3,815,527 | A | 6/1974 | Dobbins |
| 3,884,401 | A | 5/1975 | Winkler |
| 3,913,503 | A | 10/1975 | Becker |
| 4,239,715 | A | 12/1980 | Pratt |
| 4,279,949 | A | 7/1981 | Esser |
| 4,369,025 | A | 1/1983 | Von Der Weid |
| 4,579,252 | A | 4/1986 | Wilson |
| 4,591,402 | A | 5/1986 | Evans et al. |
| 4,630,755 | A | 12/1986 | Campbell |
| 4,669,634 | A | 6/1987 | Leroux |
| 4,889,433 | A | 12/1989 | Pratt |
| 4,938,816 | A | 7/1990 | Beaman et al. |
| 5,017,753 | A | 5/1991 | Deckard |
| 5,053,090 | A | 10/1991 | Beaman et al. |
| 5,132,143 | A | 7/1992 | Deckard |
| 5,204,055 | A | 4/1993 | Sachs et al. |
| 5,252,264 | A | 10/1993 | Forderhase et al. |
| 5,316,580 | A | 5/1994 | Deckard |
| 5,340,656 | A | 8/1994 | Sachs et al. |
| 5,354,414 | A | 10/1994 | Feygin |
| 5,387,380 | A | 2/1995 | Cima et al. |
| 5,433,520 | A | 7/1995 | Adams |
| 5,506,607 | A | 4/1996 | Sanders, Jr. et al. |
| 5,597,589 | A | 1/1997 | Deckard |
| 5,599,581 | A | 2/1997 | Burton et al. |
| 5,601,868 | A | 2/1997 | Gerhardt |
| 5,616,294 | A | 4/1997 | Deckard |
| 5,639,070 | A | 6/1997 | Deckard |
| 5,639,402 | A | 6/1997 | Barlow et al. |
| 5,647,931 | A | 7/1997 | Retallick et al. |
| 5,658,412 | A | 8/1997 | Retallick et al. |
| 5,934,343 | A | 8/1999 | Gaylo et al. |
| 6,036,777 | A | 3/2000 | Sachs |
| 6,094,994 | A | 8/2000 | Satake et al. |
| 6,147,138 | A | 11/2000 | Hochsmann et al. |
| 6,216,508 | B1 | 4/2001 | Matsubara et al. |
| 6,305,769 | B1 | 10/2001 | Thayer et al. |
| 6,316,060 | B1 | 11/2001 | Elvidge et al. |
| 6,322,728 | B1 | 11/2001 | Brodkin et al. |
| 6,405,095 | B1 | 6/2002 | Jang et al. |
| 6,416,850 | B1 | 7/2002 | Bredt et al. |
| 6,616,030 | B2 | 9/2003 | Miller |
| 6,719,506 | B2 | 4/2004 | Chang et al. |
| 6,764,636 | B1 | 7/2004 | Allanic et al. |
| 2003/0004599 | A1 | 1/2003 | Herbak |
| 2003/0113729 | A1 | 6/2003 | DaQuino et al. |
| 2004/0012112 | A1 | 1/2004 | Davidson et al. |
| 2004/0038009 | A1 | 2/2004 | Leyden et al. |
| 2004/0170765 | A1 | 9/2004 | Ederer et al. |
| 2005/0093194 | A1 | 5/2005 | Oriakhi et al. |
| 2006/0105102 | A1 | 5/2006 | Hochsmann et al. |
| 2006/0175346 | A1 | 8/2006 | Ederer et al. |
| 2008/0260945 | A1 | 10/2008 | Ederer et al. |
| 2009/0177309 | A1* | 7/2009 | Kozlak .......... 700/119 |
| 2010/0291314 | A1 | 11/2010 | Kashani-Shirazi et al. |
| 2012/0097258 | A1 | 4/2012 | Hartmann |
| 2012/0189102 | A1 | 7/2012 | Maurer et al. |
| 2012/0291701 | A1 | 11/2012 | Grasegger et al. |
| 2013/0000549 | A1 | 1/2013 | Hartmann |
| 2013/0004610 | A1 | 1/2013 | Hartmann et al. |
| 2013/0026680 | A1 | 1/2013 | Ederer et al. |
| 2013/0029001 | A1 | 1/2013 | Gunther et al. |
| 2013/0189434 | A1 | 7/2013 | Randall et al. |
| 2014/0048980 | A1 | 2/2014 | Crump et al. |
| 2014/0048981 | A1* | 2/2014 | Crump et al. .......... 264/401 |
| 2014/0236339 | A1* | 8/2014 | Fagan .......... 700/160 |
| 2014/0271961 | A1* | 9/2014 | Khoshnevis .......... 425/78 |

FOREIGN PATENT DOCUMENTS

| | | |
|---|---|---|
| DE | 4325573 | 2/1995 |
| DE | 19545167 A1 | 6/1997 |
| DE | 100 47 614 A1 | 4/2002 |
| DE | 101 05 504 A1 | 8/2002 |
| DE | 69707192 T2 | 11/2002 |
| DE | 10 117 875 | 1/2003 |
| DE | 10 216 013 A1 | 10/2003 |
| DE | 69634921 T2 | 12/2005 |
| DE | 201 22 639 U1 | 11/2006 |
| DE | 10 2005 056 260 A1 | 6/2007 |
| DE | 10 2009 030 113 A1 | 12/2010 |
| EP | 0224621 A1 | 6/1987 |
| EP | 0318247 A1 | 5/1989 |
| EP | 0431924 A2 | 6/1991 |
| EP | 0688262 | 12/1995 |
| EP | 0739666 | 10/1996 |
| EP | 1415792 | 5/2004 |
| EP | 1442870 | 8/2004 |
| EP | 1872928 A1 | 1/2008 |
| FR | 2790418 | 9/2000 |
| GB | 2382798 | 11/2003 |
| WO | 95/18715 A1 | 7/1995 |
| WO | 96/05038 A1 | 2/1996 |
| WO | 98/28124 A2 | 7/1998 |
| WO | 00/21736 A1 | 4/2000 |
| WO | 00/51809 A1 | 9/2000 |
| WO | 00/78485 A2 | 12/2000 |
| WO | 01/26885 A1 | 4/2001 |
| WO | 01/34371 A2 | 5/2001 |
| WO | 01/68375 A2 | 9/2001 |
| WO | 01/72502 A1 | 10/2001 |
| WO | 02/26419 A1 | 4/2002 |
| WO | 02/26420 A1 | 4/2002 |
| WO | 02/064353 A1 | 8/2002 |
| WO | 02/064354 A1 | 8/2002 |
| WO | 02/083323 A2 | 10/2002 |
| WO | 03/016030 A1 | 2/2003 |
| WO | 03/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/010907 A1 | 2/2004 |
| WO | 2004/112988 A2 | 12/2004 |
| WO | 2005/080010 A1 | 9/2005 |
| WO | 2005/082603 A1 | 9/2005 |
| WO | 2005/097476 A2 | 10/2005 |
| WO | 2005/113219 A1 | 12/2005 |
| WO | 2008/022615 A2 | 2/2008 |
| WO | 2008/055615 A1 | 5/2008 |

OTHER PUBLICATIONS

Copending National Phase Application, WO 02/083323, Oct. 24, 2002, published as US 2004/0170765A1 on Sep. 2, 2004.
Copending National Phase Application, WO 03/086726, Oct. 17, 2005, published as US 2006/0105102 A1 on May 18, 2006.
Copending National Phase Application, WO 03/097518, Jun. 24, 2005, published as US 2006/0175346 A1 on Aug. 10, 2006.
Copending National Phase Application, WO 05/080010, Sep. 1, 2005, published as US2008/0260945 A1 on Oct. 23, 2008.
Copending National Phase Application, WO 08/022615, Feb. 28, 2008, published as US 2010/0291314 A1 on Nov. 18, 2010.
Copending National Phase Application, WO 2010/149133, published as US 2012/0097258 A1 on Apr. 26, 2012.
Opposition of Patent No. DE10047614, Jun. 25, 2003.
Opposition to European Patent No. 1322458 B1, Jan. 19, 2005.
International Search Report, PCT/DE02/01103, (Published as WO2002/083323), Sep. 30, 2002.
International Search Report, PCT/DE00/03324, (Published as WO2002/026419), Jun. 5, 2001.
International Search Report, PCT/DE01/03661, (Published as WO2002/026420), Feb. 28, 2002.
International Search Report and Written Opinion dated Feb. 14, 2008 for PCT/DE07/01372, (Published as WO2008/022615 A2 on Feb. 28, 2008).

(56) References Cited

OTHER PUBLICATIONS

International Preliminary Report on Patentability dated Feb. 24, 2009 for PCT/DE07/01372, (Published as WO2008/022615 A2 on Feb. 28, 2008).

International Search Report dated Oct. 28, 2010, for Corresponding PCT Application No. PCT/DE2010/000687 filed Jun. 18, 2010.

International Preliminary Report on Patentability dated Jan. 4, 2012, for Corresponding PCT Application No. PCT/DE2010/000687 filed Jun. 18, 2010 (published as WO2010/149113 A1 on Dec. 29, 2010.

Written Opinion dated Dec. 22, 2011, for Corresponding PCT Application No. PCT/DE2010/000687 filed Jun. 18, 2010.

Cima et al., "Computer-derived Microstructures by 3D Printing: Bio- and Structural Materials," SFF Symposium, Austin, TX, 1994.

EOS Operating Manual for Laser Sintering Machine with Brief Summary.

Gephart, Rapid Prototyping, pp. 118-119.

Jacobs et al., 2005 SME Technical Paper, title "Are QuickCast Patterns Suitable for Limited Production?"

Marcus et al., Solid Freedom Fabrication Proceedings, Nov. 1993.

Marcus, et al., Solid Freeform Fabrication Proceedings, Sep. 1995, p. 130-33.

Sacks et al., "Three-Dimensional Printing: Rapid Tooling and Prototypes Directly from a CAD Model", Massachusetts Institute of Technology, pp. 131-136, (1992).

Sachs et al., "Three-Dimensional Printing: Rapid Tooling and Prototypes Directly from a CAD Model", Massachusetts Institute of Technology, pp. 143-151, (1992).

Segal, Feature Article—Rapid Tooling—Cast Resin and Sprayed Metal Tooling, (1995).

Williams, "Feasibility Study of Investment Casting Pattern Design by Means of Three Dimensional Printing", Department of Mechanical Engineering, pp. 2-15, (1989).

* cited by examiner

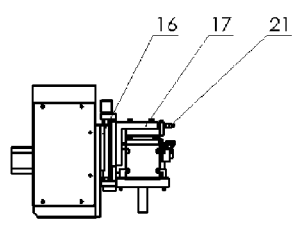
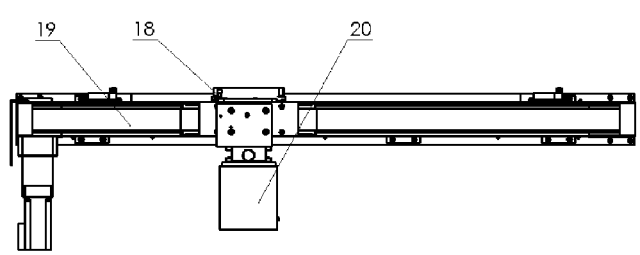
Fig. 1  Fig. 2
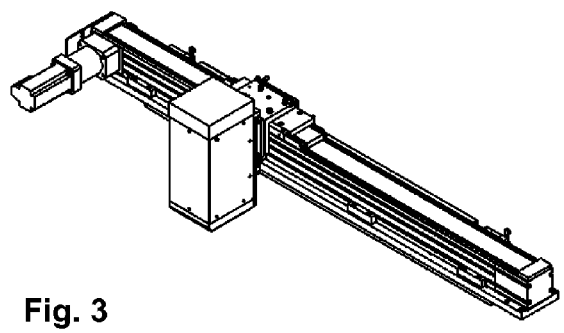
Fig. 3

DEVICE FOR PRODUCING THREE-DIMENSIONAL MODELS BY A LAYERING TECHNIQUE

The invention relates to a device for producing three-dimensional models by a layering technique according to the definition of the species in patent claim 1.

A method for producing three-dimensional objects by a layering technique from computer data is described in the European patent specification EP 0 431 924 B1. In this method, a particulate material is deposited in a thin layer onto a platform, and a liquid binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which the remaining power is removed, for example by brushing.

Layering methods, or methods for building models by layering techniques, are also known, in which the material for building the desired object is dispensed entirely by using print heads. For example, a method is known from WO 200168375 A2, in which light-hardened material is dispensed onto a target area via a plurality of individually controllable nozzles, and this area is solidified during printing, using a light source. According to this described method, additional material is dispensed in addition to the actual object material via one or multiple print heads, this additional material being used as support material for overhanging object structures.

All these methods are combined below under the term "three-dimensional printing method," 3D printing method or method using a layering technique.

In 3D printing methods, nozzles are used to apply material in the form of droplets, and these nozzles are customarily combined in print heads. Print heads used in 3D printing methods of this type usually comprise multiple components. So-called print modules, which have a limited number of individually controllable nozzles, form a key element thereof. The nozzles operate according to a drop-on-demand principle, customarily with the aid of piezoelectric actuators which cause one droplet to be discharged from each controlled nozzle upon the application of a corresponding current pulse. The droplets are relatively small and some of them have diameters of less than 50 μm.

In addition to the electrical connections, the print modules also have a fluid supply line which usually leads to a fluid reservoir, which is preferably located above the nozzles. The print modules are located in a receptacle which permits multiple modules to be aligned with each other.

It is apparent from the size of the droplets that the deviation of the nozzle positions in relation to each other must, in each case, be less than the droplet diameter and is therefore usually only a few micrometers. A receptacle should therefore have a design which is as rigid as possible in order to statically and dynamically maintain a precise position of the print modules once this position has been selected.

The rigidity requirements of a receptacle of this type are very high in this case, since bending of the receptacle by just a few micrometers would result in unacceptable movement of the print modules in relation to each other.

A print head also has sensors for detecting the fluid temperature, possibly devices for regulating the temperature of the modules and the fluid, sensors for monitoring media levels and electronics for processing the electrical signals.

It is easily apparent herefrom that the overall print head has a not inconsiderable weight. This weight is accommodated by a so-called print head holder, which connects the print head to the frame or the moving carriage of a mobile unit, depending on the device design.

It is furthermore desirable to design the print head holder in such a way that the print head may be aligned in all directions relative to the build space, and the distance to the build space may be adjusted.

This distance to the build space is usually just a few millimeters, customarily 1 to 3 mm. The small droplets cover this distance at a nozzle discharge speed of what is customarily 5 to 10 m/s. Due to the movement of the print head relative to the build space while writing to the build space, an air flow is produced parallel to the gap, which causes the droplets to strike the build space at an offset angle. If the distance between the print head and build space changes during a printing operation, the offset also changes. Tolerable deviations in this case are again within a range smaller than the droplet size, i.e., in the range of just a few micrometers. The ability to precisely adjust the distance and maintain it throughout the entire build process is therefore important.

According to the prior art, the print heads are centrally accommodated by standardized positioning platforms for adjusting the height and by goniometers for adjusting the angle. A metal bracket, for example, is used for connection to a positioning unit. The metal bracket is rotatably mounted horizontally, and it is adjustable by means of a built-in screw gauge.

Other print head holders which are adjustable without tools are known, for example, from DE 69707192 T2 and DE 69012292 T2, which, however, are limited to more compact and lighter-weight print heads that operate in a less aggressive medium environment. Other holders, such as that described in DE 4005340 C2, for example, relate to stationary print heads.

The print heads are usually moved over the build space by linear positioning systems during the application process, or the build space passes underneath the upright print heads. Depending on the number of nozzles, the size of the build space and the desired resolution, a different number of time-consuming movement operations are needed to write to the entire build space using the print heads. One idea is therefore to increase the application speed by increasing the number of nozzles.

For example, only one print path is needed if the print head extends over one entire side of the build space, and the number and arrangement of the nozzles are sufficient to achieve the desired resolution. It is therefore advantageous to use the largest possible print head with many nozzles and thus a large writing width, which is able to cover and print the largest possible portion of one side of the build space.

Due to the rigidity requirements within the print head or the necessary units within the print head, the writing width of the print head has a direct impact on the print head dimensions and weight, as already explained in greater detail above. For structural reasons, an increase in the print head width from 7 cm to 100 cm results in an increase in the ratio between the print head weight and writing width from approximately 0.3 kg/cm to approximately 1 kg/cm.

The rigidity and adjustability requirements of a print head holder therefore increase substantially along with the increase in writing width. If the writing width of the print head is correspondingly expanded in the range of more than 100 mm, print head holders according to the prior art may no longer be used.

A holder according to the prior art, which has a positioning platform, is not inherently rigid and is unable to transmit the process forces produced by a heavy print head. Positioning platforms of this type are furthermore highly susceptible to contamination due to their they complex guides and threaded spindles. Secure clamping is usually not possible.

Angle adjustments with the aid of a goniometer should be reasonably carried out only at one point. Mounting at only one point is possible only by means of an over-dimensioned, heavy mounting, due to the enormous leverage forces. A central arrangement is furthermore possible only between the linear platform and the print head, which unnecessarily increases the size of the apparatus.

Due to the high acceleration values and with the heavy print head weight, the torque load on the print head holder is so high that the print head can no longer be mounted centrally, due to its width.

The adjusting device must be designed to be massive enough to withstand the high forces and yet also be finely adjustable.

The holder must also be designed to be rigid enough so that no interfering vibrations set in.

Since the accessibility of a print head is limited in a machine, the adjusting operation must take place easily and quickly.

For this purpose, the adjusting situation must be clearly evident and limited to just a few intuitive operations using just a few standard tools.

To ensure a consistent print quality, the adjustments should also not change later on. The clamping technique of the adjusting apparatus should not influence the adjustments in this case. The clamping and adjusting directions must be separate from each other.

Furthermore, the clamped connection must be strong enough that the process forces and any vibrations that may occur are unable to influence the set values.

The object of the present invention is therefore to provide a print head holder for a 3D printing machine which ensures an adjustable and rigid connection to a positioning unit or a frame for print heads having a writing width of more than 100 mm.

According to the invention, the object is achieved by a device according to patent claim 1.

According to the present invention, a device for producing three-dimensional models by a layering technique is provided, in which at least one print head is provided for selectively dispensing at least one material onto a target surface in the form of droplets. The print head is in engagement with a receptacle at two points spaced a distance apart. The position and alignment of the print head relative to the target surface are furthermore steplessly adjustable via these two points, and the receptacle and the target surfaces are movable relative to each other.

This means that either the print head has a mobile mechanism which is movable relative to the target surface in the direction of the target surface plane, or the target surface is movable relative to the print head in the direction of the target surface plane.

A receptacle in this case is not necessarily understood to be a single component. According to the present invention, a receptacle may be assembled from different components. If necessary, the unit may also be called a receiving apparatus.

The points designate locally delimited areas to which the position of the print head may be relatively easily adjusted.

In this case, the print head is preferably in engagement with the receptacle on an intrinsically rigid plate outside the print area with the aid of two retaining elements at the points.

Such a preferable embodiment of the invention makes it possible to mount and remove the device particularly easily. The connection at only two points or areas makes it possible to clearly represent each adjustment and provide them with a statically determinate attachment.

If, according to a particularly preferred embodiment of the invention, the retaining elements are rotatably mounted at the retaining points and designed, in particular, as round rods, the adjustability may be achieved particularly effectively.

A particularly rigid design of the device according to the invention may be achieved if the retaining elements are fixedly connected to the receptacle.

According to a particularly preferred specific embodiment of the present invention, an even better and simpler adjustability of the nozzle plate may frequently be achieved if the retaining elements are in engagement with lever arms which are disposed largely parallel to the plate.

It may furthermore be advantageous if the lever arms in a device according to the invention are each freely and steplessly adjustable on a plane of the nozzle plate with regard to the angle and perpendicularly to the plane of the nozzle plate.

The lever arms may be particularly preferably clamped to the retaining elements for adjusting the position and alignment of the print head in relation to the target surface.

According to a preferred specific embodiment of the invention, a device which has an adjusting apparatus may be provided, in which two round rods hold the print head in the retaining points on the sides and are adjustably mounted in all directions even in projecting levers.

Since the acceleration paths and thus also the machine dimensions increase along with the weight of the print head, and since the print head is designed to be as wide as possible, high priority is placed on a low weight of the print head holder, which is achieved in a device according to the present invention.

Since the ratio between the rigidity and the weight of the device should be as great as possible, an adjusting apparatus having only a few, multifunctional and rigid parts is provided according to the present invention.

To maintain small machine dimensions, the print head holder must also be designed to occupy as little space as possible. The adjusting apparatus according to the present invention is therefore compact and is not located between the print head and the carriage, as in the case of holders according to the prior art.

Due to the fact that the holder and print head are designed as replaceable modules, high system availability is ensured. To ensure fast replacement, the print head, according to one embodiment of the present invention, along with the holder, is easily separable from the positioning unit or the frame, since the adjusting apparatus has easily detachable connections.

According to one specific embodiment of the invention, the print head may be exposed without problems to the aggressive liquid print media and also, if necessary, to the media to be printed, for example fine, abrasive powder materials, due to the uncomplicated, open and easy-to-clean structure of the device.

The device according to the present invention may be implemented cost-effectively and with good availability, since the function components are easy to manufacture in common production processes.

For the purpose of detailed explanation, the invention is illustrated on the basis of preferred exemplary embodiments in the following drawings.

In the drawing:

FIG. 1 shows a side view of a print head, including a holder, according to the prior art;

FIG. 2 shows a top view of a print head, including a holder, according to the prior art;

FIG. 3 shows an oblique projection of a print head, including a holder, according to the prior art;

FIGS. 1, 2 and 3 show a structure of a print head in a device for building models in layers according to the prior art.

Figure 4:
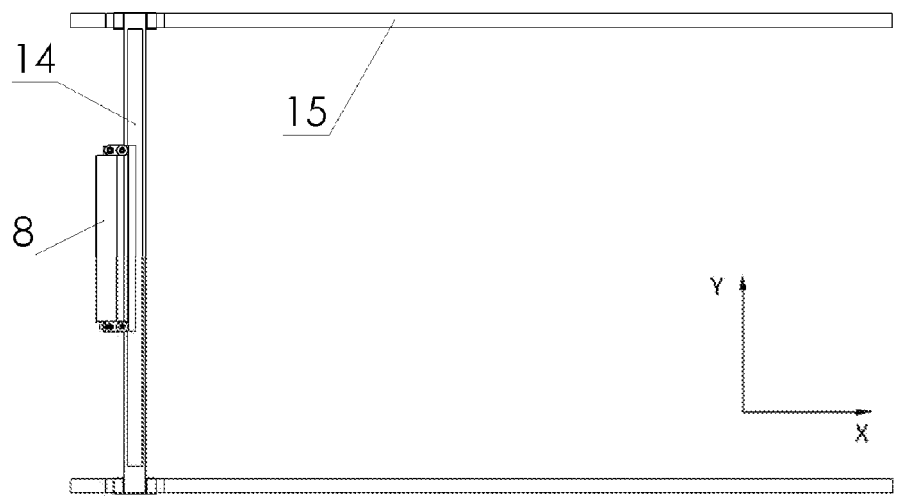
FIG. 4 shows a representation of the arrangement of the axes of motion of a print head according to one preferred specific embodiment of the invention.
Figure 5:
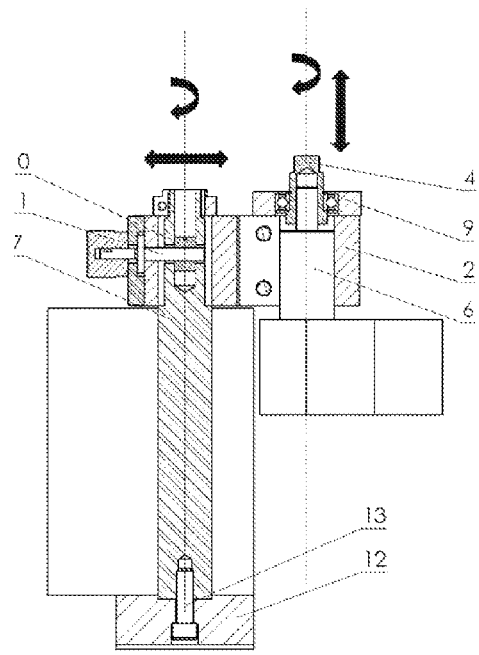
FIG. 5 shows a sectional representation of one half of an adjusting apparatus or a holding device of a preferred specific embodiment of the device according to the invention.
Figure 6:
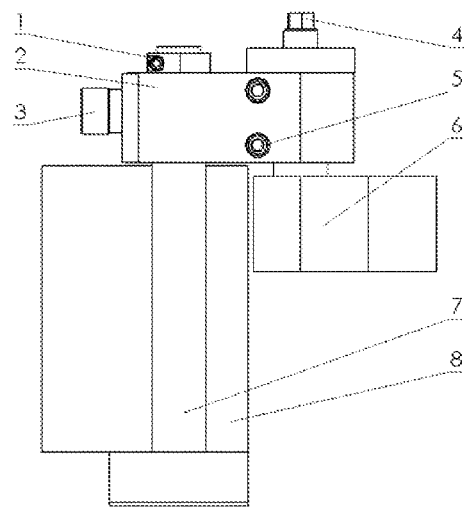
FIG. 6 shows a side view of one half of the adjusting apparatus or the holding device according to FIG. 5.
Figure 7:
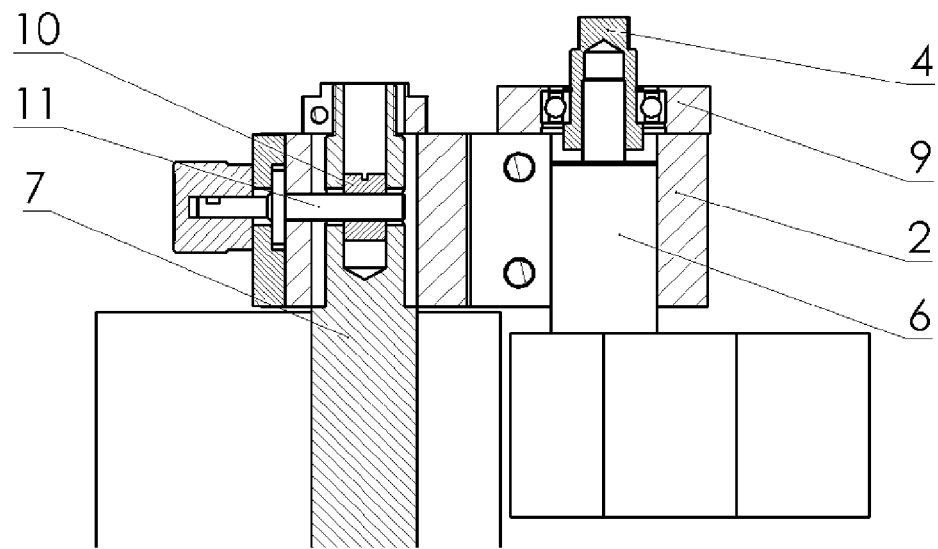
FIG. 7 shows an enlarged representation of the sectional representation of one half of the adjusting apparatus or the holding device according to FIG. 5.
Figure 8:
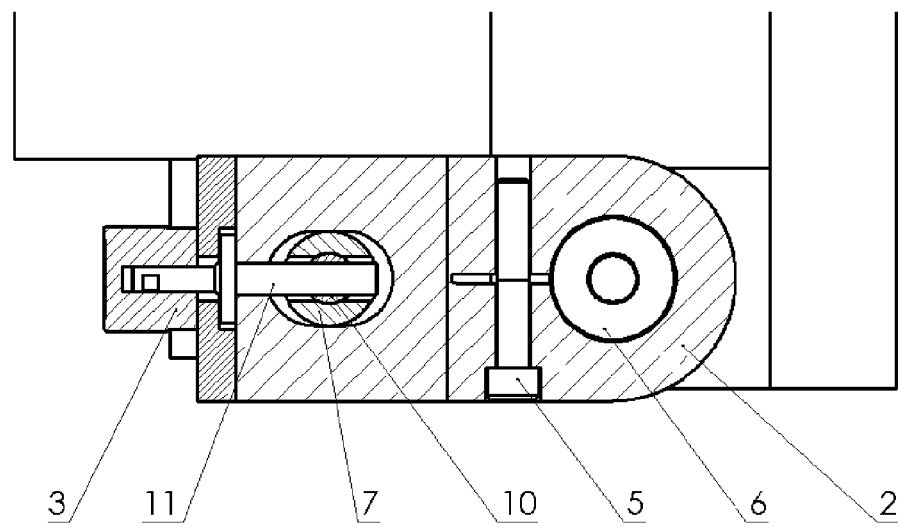
FIG. 8 shows another sectional representation of the adjusting apparatus according to FIG. 5.
Figure 9:
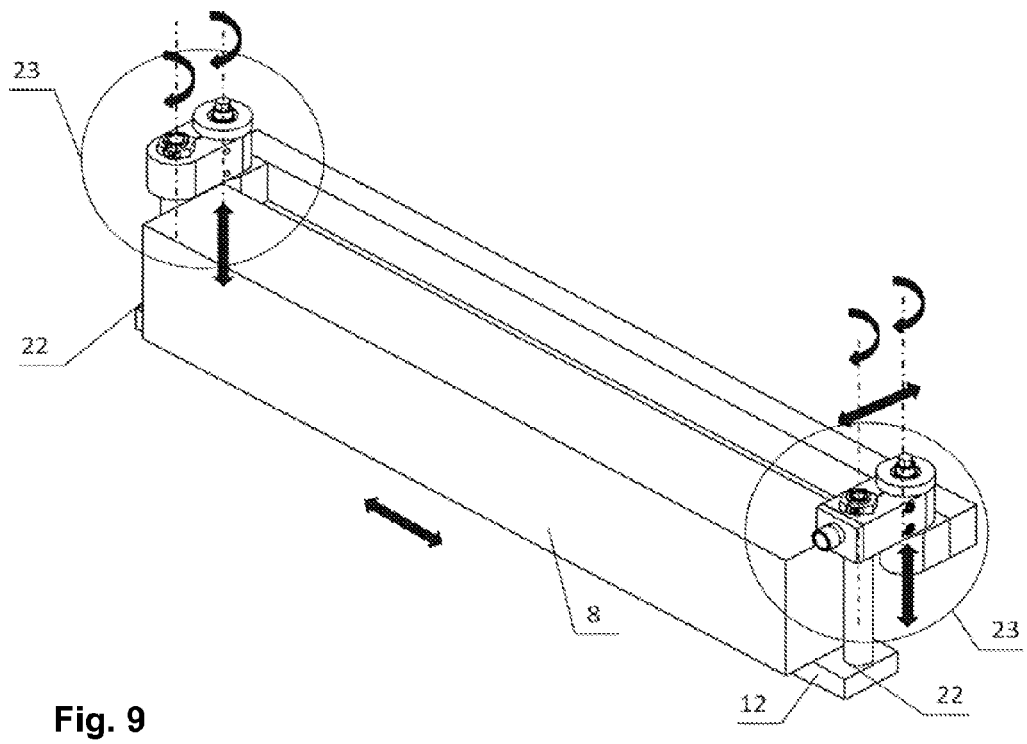
FIG. 9 shows an oblique projection of the adjusting apparatus or the holding device with a marking of the degree of freedom according to FIG. 5.
Figure 10:
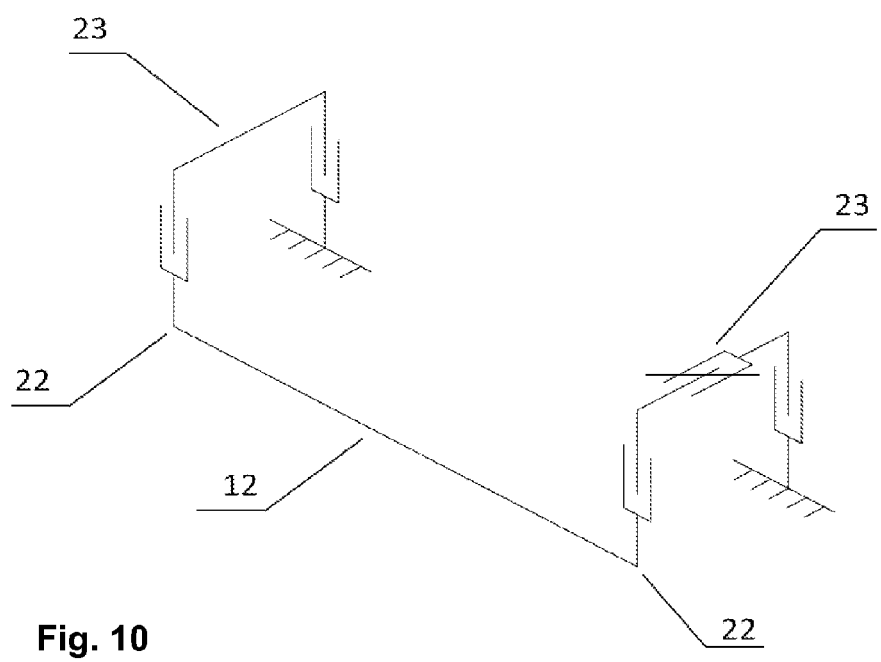
FIG. 10 shows an exemplary representation of the bearing situation of the adjusting apparatus according to FIG. 5.

Print head 20 in this case is moved over a target surface by a linear unit 19 which comprises a drive and a guide. Print head 20 is adjusted vertically to the target surface via a commercial positioning platform 16.

The accommodation on linear unit 19 is provided by a metal bracket 17. Metal bracket 17 is rotatably mounted in the receptacle and adjustable with the aid of a built-in screw gauge 21, so that the angle of print head 20 is adjustable via angle adjuster 18 on the nozzle plate plane. A device of this type according to the prior art does not permit any other adjustments.

FIG. 4 shows a top view of one specific embodiment of the device according to the invention. A print head 8 in this case is also attached to a linear unit 14, which forms an orthogonally aligned portal together with another linear unit axis pair 15. The target surface located within the portal may thus be written or printed.

During a build process using a layering technique, print head 8 is first positioned on linear unit 14 in a first print stripe area. In the next process step, axis pair 15 moves axis 14 over the target surface at a constant speed. A stripe, which corresponds approximately to the width of the print head, is selectively printed. Before the print head returns on print axis 14, print head 8 is offset by the width of one print stripe, using linear unit 15.

Print head 8 is permanently connected to the moving carriage of axis 14 via a holder. To produce an optimum print image, the row of nozzles in print head 8 must be aligned precisely perpendicularly to the direction of printing (X direction). Moreover, the distance and parallelism of the nozzle plate to the target surface must be precisely adjustable.

A preferred specific embodiment of the present invention is explained in greater detail with reference to FIGS. 5 through 10.

According to the illustrated preferred specific embodiment, print head 8 is accommodated at two points 22 spaced a distance apart, beneath an intrinsically rigid nozzle plate 12, in this case also at the center of gravity of solid round rods 7.

Round seats are provided in nozzle plate 12 to ensure a stable connection of round rods 7 to nozzle plate 12. Each rod 7 is furthermore screwed through nozzle plate 12 from below, using a single screw 13, to provide easy access.

Such a design of the device according to the invention ensures an easy, cost-effective, stable and highly rigid connection, while allowing fast removal of print head 8 from print head holder 12. The area shown in FIG. 9 forms receptacle 23.

Rods 7, and thus also the entire adjusting apparatus, are disposed on the side of print head 8. This saves space in the printing direction and permits a compact, easily accessible system configuration.

Round rods 7 are rotatably mounted in lever arms 2, due to their shape. Lever arms 2 are disposed on the side, above nozzle plate 12.

Rod 7 is thus simultaneously characterized as a linking element and an adjusting component and thus meets the requirement of just a few, easy-to-clean components.

According to the illustrated, preferred specific embodiment, rods 7 have threads above lever arm 2, so that they may be fixed in lever arms 2 in all directions without twisting, using clampable nuts 1.

Each lever arm 2 is rotatably mounted on a holding cylinder 6 on the side facing away from round rods 7. On this side, a slotted, cylindrical hole is provided in lever arm 2 and may therefore be designed to be clamped with the aid of screws 5. This clamp connection may be used to secure a completed adjustment of print head 8 without influences.

Both holding cylinders 6 are rigidly connected to a carriage of positioning unit 14. A horizontal movement may take place with the aid of an adjusting wheel 3.

Releasing and fixing a print head position:

1. Adjusting the Height

On its upper side, holding cylinder 6 has a bolt which has an outer thread.

An adjusting nut 4 is supported on the threaded bolt of holding cylinder 6 and carries lever arm 2 via an axial bearing 9 permanently connected thereto.

Unscrewing nut 4 increases the distance between print head 8 and the build space or the target surface. After adjusting the height, lever arm 2 is permanently fixed to holding cylinder 6 via clamping screws 5. The clamping movement deviates from the adjusting direction and is therefore unable to influence a finished adjustment.

If the connection of holding cylinder 6 on nozzle plate 12 is designed as a joint bearing, i.e., if it has a mobility of three according to Gruebler, a large horizontal angle adjustment of nozzle plate 12 in relation to the underside is possible. For this purpose, only one lever arm 2 is adjusted in height.

If the distance between the two lever arms 2 is great enough, an angle adjustment is also possible.

Since only small angles are customarily adjusted, a slight twisting of the apparatus is acceptable.

2. Adjusting the Angle

For a high print image resolution, the nozzles positioned consecutively in the printing direction are precisely aligned with each other on the underside of the print head.

To align the nozzles, the angle of print head 8 must be adjusted in the positioning direction.

In the present embodiment, the retaining hole for round rod 7 is designed as a slot in the lever direction in the case of at least one lever arm 2. Round rod 7 is guided in this slot without clearance. Due to its outer contour, round rod 7 is mounted rotatably around its axis in the slot for adjusting the angle.

For the purpose of precise, stepless adjustment, round rod 7 carries a cylinder element 10 in an axial hole, this cylinder element having a thread positioned perpendicularly to its axis.

An adjusting bolt 11 is axially mounted without clearance on lever arm 2, the fine thread of the adjusting bolt being used to steplessly adjust the position of round rod 7 in lever arm 2 with the aid of cylinder element 10.

For this purpose, round rod 7 is slotted on its circumference in such a way that the thread of cylinder element 10 may be reached by adjusting bolt 11.

In summary, the device is designed in such a way that it has a statically determinate mounting for horizontal adjustment.

This may be accomplished with the aid of the so-called Gruebler equation. This is as follows:

$$F = B \cdot (n-1-g) + \Sigma b_i + \Sigma s_i$$

whereby the individual symbols mean:
F: Degree of freedom
B: Type of motion (B=3 for planar arrangements)
G: Number of joints
bi: Mobility of joint i
si: Special dimensions maintained
n: Number of elements If the mounting of the holding device is viewed in the open state according to the above equation without considering vertical mobility, then one can find a horizontally statically determinate mounting according to FIG. 10.

The print head is held by two lever arms 2 which are mounted at each end to permit horizontal rotation. One pivot bearing of each lever arm 2 is permanently connected to the print head on one side and permanently connected to the carriage of the print head positioning unit on the other side.

At least one of lever arms 2 is furthermore designed as a linear bearing which has one rotational degree of freedom.

If one of the pivot bearings is fixed in place during a horizontal angle adjustment, the following bearing situation results.

The total number of the existing, connected construction elements equals 4, and the number of joints is 5.

The Gruebler equation then results in:

$$F = 5 \cdot (4-1-5) + 5 \cdot 1 = 1$$

The total arrangement is thus statically determinate and does not require any special dimensions.

Once all positions are set, the holding device is fixed in place on round rod 7 via clamping screws 5 in lever arm 2 and via clamping nut 1.

The clamped connection is independent of the adjusting direction, so that the adjustment made during clamping is not influenced. Rods 7 and levers 2 are solid and withstand high flexural and torsional torques due to their shape and the levers, which are kept structurally short.

The shape of round rods 7 permits easy, fully evident adjustments in all directions.

The adjusting device is reduced to just a few compact yet highly rigid parts. This permits good accessibility with small structural dimensions and low manufacturing costs.

The adjusting mechanism is compact and may be designed to be resistant to process media. All components are easy to clean.

Rods 7, and thus also the entire adjusting apparatus, are disposed on the side of the print head. This saves build space in the printing direction. Round rods 7 are rotatably mounted in lever arms 2, due to their shape. The rods are simultaneously characterized as a linking element and an adjusting component.

LIST OF REFERENCE NUMERALS

1 Nut
2 Lever arms
3 Adjusting wheel
4 Adjusting nut
5 Screw
6 Holding cylinder
7 Rods
8 Print head
9 Axial bearing
10 Cylinder element
11 Adjusting bolt
12 Nozzle plate
13 Screw
14 Linear unit/axis
15 Linear unit axis pair
16 Positioning platform
17 Metal bracket
18 Angle adjustment
19 Linear unit
20 Print head
21 Built-in screw gauge
22 Points
23 Receptacle

What is claimed is:

1. A device for producing three-dimensional models by a layering technique comprising:
    at least one print head being provided for selective dispensing at least one material onto a target surface in the form of droplets,
    wherein the print head is in engagement with a receptacle at two points spaced a distance apart, wherein the receptacle includes one or more adjustment elements at each of the two points, wherein the adjustment elements are sufficiently adjustable so that the position and alignment of the print head in relation to the target surface is steplessly adjustable in all spatial directions via the adjustment elements at these two points,
    wherein the print head includes one or more rows of nozzles, wherein the one or more rows are aligned perpendicular to an x-direction of printing, and
    wherein the receptacle and the target surface are movable in relation to each other.

2. The device of claim 1, wherein the one or more print heads includes a plurality of the rows of nozzles aligned perpendicular to the x-direction of printing.

3. The device of claim 1, wherein the print head is in engagement with the receptacle on an intrinsically rigid plate outside the print area with the aid of two retaining elements at the points.

4. The device of claim 3, wherein the retaining elements are rotatably mounted in the points.

5. The device of claim 3, wherein the retaining elements are permanently connected to the receptacle.

6. The device of claim 3, wherein the retaining elements are in engagement with lever arms which are disposed largely parallel to the plate.

7. The device of claim 3, wherein the retaining elements are in engagement with lever arms, wherein the lever arms are each freely and steplessly adjustable on a plane of the plate with regard to the angle and perpendicularly to the plane of the plate.

8. The device of claim 7, wherein the lever arms are clamped by the retaining elements for the purpose of adjusting the position and alignment of the print head in relation to the target surface.

9. The device according to claim 3, wherein the retaining elements are in engagement with lever arms which are disposed largely parallel to the plate.

10. The device according to claim 1, wherein the device includes lever arms clamped by retaining elements for the purpose of adjusting the position and alignment of the print head in relation to the target surface.

11. The device of claim 3, wherein the retaining elements include round rods.

12. The device of claim 11, wherein the retaining elements are rotatably mounted in the points.

13. The device of claim 2, wherein the print head is in engagement with the receptacle on an intrinsically rigid plate outside the print area with the aid of two retaining elements at the points.

14. The device of claim 13, wherein the retaining elements are rotatably mounted in the points.

15. The device of claim 13, wherein the retaining elements are permanently connected to the receptacle.

16. The device of claim 13, wherein the retaining elements are in engagement with lever arms which are disposed largely parallel to the plate.

17. The device of claim 13, wherein the retaining elements include round rods.

18. The device according to claim 2, wherein the device includes lever arms clamped by retaining elements for the purpose of adjusting the position and alignment of the print head in relation to the target surface.

19. A method for producing three-dimensional models by a layering technique comprising the steps of:
   depositing a particulate material onto a target surface; and
   selectively dispensing at least one material in the form of droplets from at least one print head onto the target surface;
   wherein the print head is in engagement with a receptacle at two points spaced a distance apart, wherein the receptacle includes one or more adjustment elements at each of the two points, wherein the adjustment elements are sufficiently adjustable so that the position and alignment of the print head in relation to the target surface is steplessly adjustable in all spatial directions via the adjustment elements at these two points,
   wherein the print head includes one or more rows of nozzles, wherein the one or more rows are aligned perpendicular to an x-direction of printing, and
   wherein the step of selectively dispensing includes a step of moving the receptacle over the target surface in the x-direction of printing.

20. The method of claim 19, wherein the one or more print heads includes a plurality of the rows of nozzles aligned perpendicular to the x-direction of printing.

* * * * *